United States Patent
Inomata et al.

(10) Patent No.: US 10,173,326 B2
(45) Date of Patent: Jan. 8, 2019

(54) INDUSTRIAL ROBOT TEACHING METHOD WITH CALCULATING A POSITION

(71) Applicant: NIDEC SANKYO CORPORATION, Suwa-gun, Nagano (JP)

(72) Inventors: Tetsuya Inomata, Nagano (JP); Masami Hosokawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/450,402

(22) Filed: Mar. 6, 2017

(65) Prior Publication Data

US 2017/0173797 A1 Jun. 22, 2017

Related U.S. Application Data

(62) Division of application No. 14/962,387, filed on Dec. 8, 2015.

(30) Foreign Application Priority Data

Dec. 8, 2014 (JP) .................................. 2014-247682

(51) Int. Cl.
*B25J 9/16* (2006.01)
*B25J 9/00* (2006.01)

(52) U.S. Cl.
CPC ........... *B25J 9/1697* (2013.01); *B25J 9/0081* (2013.01); *B25J 9/1694* (2013.01); *Y10S 901/04* (2013.01)

(58) Field of Classification Search
CPC ........ B25J 9/1694; B25J 9/1697; B25J 9/023; B25J 13/086; B25J 13/088
See application file for complete search history.

(56) References Cited

U.S. PATENT DOCUMENTS

2011/0130864 A1* 6/2011 Hirota .................... B25J 9/1692
700/213

FOREIGN PATENT DOCUMENTS

WO        03022534 A1      3/2003

* cited by examiner

*Primary Examiner* — Gerald McClain
(74) *Attorney, Agent, or Firm* — Cantor Colburn LLP

(57) ABSTRACT

A teaching method for an industrial robot may include, while the hand is lifted up and down by the lifting mechanism, detecting, with the first sensor, a position of either the installation unit or a teaching jig to be installed on the installation unit in a vertical direction; while the hand is transferred in the first direction by the transfer mechanism, detecting, with the first sensor, a position of either the installation unit or the teaching jig in the first direction; while the hand is transferred in the first direction by the transfer mechanism, detecting, with the second sensor, a position of either the installation unit or the teaching jig in the first direction; and calculating a position of either the installation unit or the teaching jig in the second direction, in order to teach a position of the transfer object to be installed on the installation unit.

1 Claim, 4 Drawing Sheets

INDUSTRIAL ROBOT TEACHING METHOD WITH CALCULATING A POSITION

CROSS REFERENCE TO RELATED APPLICATIONS

The present application is a divisional application of U.S. patent application Ser. No. 14/962,387, filed on Dec. 8, 2015, the entire contents of which are incorporated herein by reference. The 14/962,387 application claimed the benefit of the date of the earlier filed Japanese Patent Application No. 2014-247682, filed Dec 8, 2014, priority to which is also claimed herein, and the contents of which are also incorporated by reference herein.

FIELD OF THE INVENTION

At least an embodiment of the present invention relates to an industrial robot for transferring a predetermined transfer object. Moreover, at least an embodiment of the present invention relates to a teaching method for the industrial robot for transferring a predetermined transfer object.

BACKGROUND

A robot for transferring a semiconductor wafer is conventionally well-known (for example, refer to Patent Document 1). A robot described in Patent Document 1 includes a column section that is cylindrical and able to move up and down, an arm whose root end side is connected to the column section so as to be rotatable, and a wafer grasping section (hand) that is connected to a top end side of the arm so as to be rotatable. Moreover, the robot includes a lifting mechanism for moving the column section up and down, a rotating mechanism for rotating the arm with respect to the column section, and an arm actuating mechanism for stretching/contracting the arm. The wafer grasping section is so formed as to be Y-shaped, and a transmission sensor including a light emitting part and a light receiving part is placed at a top end of the wafer grasping section.

In the case of the robot described in Patent Document 1, a teaching operation jig is used at a time of teaching the robot a position of a semiconductor wafer to be placed at a wafer placement position such as a storing container. The teaching operation jig is provided with a large disc part and a small disc part, wherein the large disc part and the small disc part are stacked in a vertical direction, in such a way that an axis center of the large disc part and an axis center of the small disc part are consistent with each other. Meanwhile, a diameter of the large disc part is the same as a diameter of an actual semiconductor wafer. The teaching operation jig is placed for use at the wafer placement position.

Moreover, at the time of teaching the robot a position of the semiconductor wafer to be placed at the wafer placement position, in the case of the robot described in Patent Document 1; at first while the wafer grasping section is moved vertically by use of the lifting mechanism, the transmission sensor detects a position of the small disc part, in a vertical direction, of the teaching operation jig placed at the wafer placement position. Then, while the wafer grasping section is brought closer to the small disc part from an outside in a radial direction of the small disc part, by use of the rotating mechanism and the arm actuating mechanism, the transmission sensor detects a position of an outside edge in the radial direction of the small disc part. Furthermore, the detecting operation is repeated by way of bringing the wafer grasping section closer to the small disc part from various directions. Then, on the basis of a plurality of positions of outside edges in the radial direction of the small disc part, wherein the outside edges being detected by the transmission sensor; a center position of the small disc part in a horizontal direction is detected. In the case of the robot described in Patent Document 1, on the basis of detection results with respect to the position of the small disc part of the teaching operation jig in the vertical direction and the center position of the small disc part of the teaching operation jig in the horizontal direction, the position of the semiconductor wafer to be placed at the wafer placement position is automatically taught.

Patent Document

Patent Document 1; International Publication No. 03/022534

As described above, at the time of automatically teaching the robot the position of the semiconductor wafer to be placed at the wafer placement position, in the case of the robot described in Patent Document 1; it is necessary to bring the wafer grasping section closer to the small disc part from the outside in the radial direction of the small disc part, and moreover from various directions. Therefore, in the case of this robot, without a space around the wafer placement position, for bringing the wafer grasping section closer to the small disc part from the various directions, it is impossible to automatically teach the robot the position of the semiconductor wafer to be placed at the wafer placement position.

SUMMARY

Then, at least an embodiment of the present invention provides an industrial robot and a teaching method for the industrial robot, with which a position of a transfer object to be installed on an installation unit can be automatically taught, even though a space around the installation unit, where the transfer object is installed, is narrow.

Means to Solve the Problem

To bring a solution for the subject described above, an industrial robot according to at least an embodiment of the present invention is an industrial robot for loading a transfer object onto an installation unit on which the transfer object is installed, and unloading the transfer object out of the installation unit; the industrial robot comprising: a hand that grasps the transfer object and linearly moves in a horizontal direction; a lifting mechanism for moving the hand up and down; a transfer mechanism for transferring the hand in a first direction, wherein the first direction represents a transfer direction of the hand at a time of transferring the transfer object to the installation unit, and a second direction represents a direction perpendicular to the first direction and a vertical direction as well; and a first sensor and a second sensor, individually including a light emitting element and a light receiving element, and being provided to the hand; wherein the first sensor is placed in such a way that an optical axis of the light emitting element of the first sensor and an optical axis of the light receiving element of the first sensor are in parallel with the second direction; the second sensor is placed in such a way that an optical axis of the light emitting element of the second sensor and an optical axis of the light receiving element of the second sensor are in a direction tilted with respect to the first direction and the second direction as well, while the optical axes being in parallel with a horizontal direction; and at a time of teaching a position of the transfer object to be installed on the installation unit; while the hand is lifted up and down by the lifting mechanism, the first sensor detects a position of either the installation unit or a teaching jig to be installed on the installation unit in a vertical direction; while the hand is transferred in the first direction by the transfer mechanism, the first sensor detects a position of either the installation unit or the teaching jig in the first direction; while the hand is transferred in the first direction by the transfer mechanism, the second sensor detects a position of either the installation unit or the teaching jig in the first direction; and a position of either the installation unit or the teaching jig in the second direction is calculated.

Furthermore, to bring a solution for the subject described above, a teaching method for an industrial robot according to at least an embodiment of the present invention is a teaching method for an industrial robot including: a hand that grasps a transfer object and linearly moves in a horizontal direction; a lifting mechanism for moving the hand up and down; a transfer mechanism for transferring the hand in a first direction, wherein the first direction represents a transfer direction of the hand at a time of transferring the transfer object to an installation unit on which the transfer object is installed, and a second direction represents a direction perpendicular to the first direction and a vertical direction as well; and a first sensor and a second sensor, individually including a light emitting element and a light receiving element, and being provided to the hand; wherein the first sensor is placed in such a way that an optical axis of the light emitting element of the first sensor and an optical axis of the light receiving element of the first sensor are in parallel with the second direction; the second sensor is placed in such a way that an optical axis of the light emitting element of the second sensor and an optical axis of the light receiving element of the second sensor are in a direction tilted with respect to the first direction and the second direction as well, while the optical axes being in parallel with a horizontal direction; and while the hand is lifted up and down by the lifting mechanism, the first sensor detects a position of either the installation unit or a teaching jig to be installed on the installation unit in a vertical direction; while the hand is transferred in the first direction by the transfer mechanism, the first sensor detects a position of either the installation unit or the teaching jig in the first direction; while the hand is transferred in the first direction by the transfer mechanism, the second sensor detects a position of either the installation unit or the teaching jig in the first direction; and a position of either the installation unit or the teaching jig in the second direction is calculated, in order to teach a position of the transfer object to be installed on the installation unit.

According to at least an embodiment of the present invention, the first sensor is placed in such a way that the optical axis of the light emitting element of the first sensor and the optical axis of the light receiving element of the first sensor are in parallel with the second direction; and the second sensor is placed in such a way that the optical axis of the light emitting element of the second sensor and the optical axis of the light receiving element of the second sensor are in a direction tilted with respect to the first direction and the second direction as well, while the optical axes being in parallel with the horizontal direction. Moreover, according to at least an embodiment of the present invention, at the time of teaching the industrial robot the position of the transfer object to be installed on the installation unit; while the hand is lifted up and down by the lifting mechanism, the first sensor detects the position of either the installation unit or the teaching jig in the vertical direction; and while the hand is transferred in the first direction by the transfer mechanism, the first sensor detects a position of either the installation unit or the teaching jig in the first direction. Furthermore, according to at least an embodiment of the present invention, at the time of teaching the industrial robot the position of the transfer object to be installed on the installation unit; while the hand is transferred in the first direction by the transfer mechanism, the second sensor detects the position of either the installation unit or the teaching jig in the first direction; and the position of either the installation unit or the teaching jig in the second direction is calculated. In other words, according to at least an embodiment of the present invention, at the time of teaching the industrial robot the position of the transfer object to be installed on the installation unit, the position of either the installation unit or the teaching jig in the second direction is calculated, without moving the hand in the second direction that is perpendicular to the moving direction of the hand at the time of transferring the transfer object to the installation unit. Therefore, according to the present embodiment, even though the space around the installation unit is narrow, it becomes possible to automatically teach the industrial robot the position of the transfer object to be installed on the installation unit, on the basis of a detection result by the first sensor and a detection result by the second sensor.

In at least an embodiment of the present invention, it is preferable that the second sensor is a sensor for detecting the hand grasping the transfer object. According to this configuration, in comparison with a case where the second sensor is separately provided in addition to a sensor for detecting the hand grasping the transfer object, a configuration of the industrial robot can be simplified.

As described above, according to at least an embodiment of the present invention, it becomes possible to automatically teach the industrial robot the position of the transfer object to be installed on the installation unit, even though the space around the installation unit, where the transfer object is installed, is narrow.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE PREFERRED EMBODIMENTS

At least an embodiment of the present invention is explained below with reference to the accompanying drawings.

(Structure of Industrial Robot)

Figure 1:
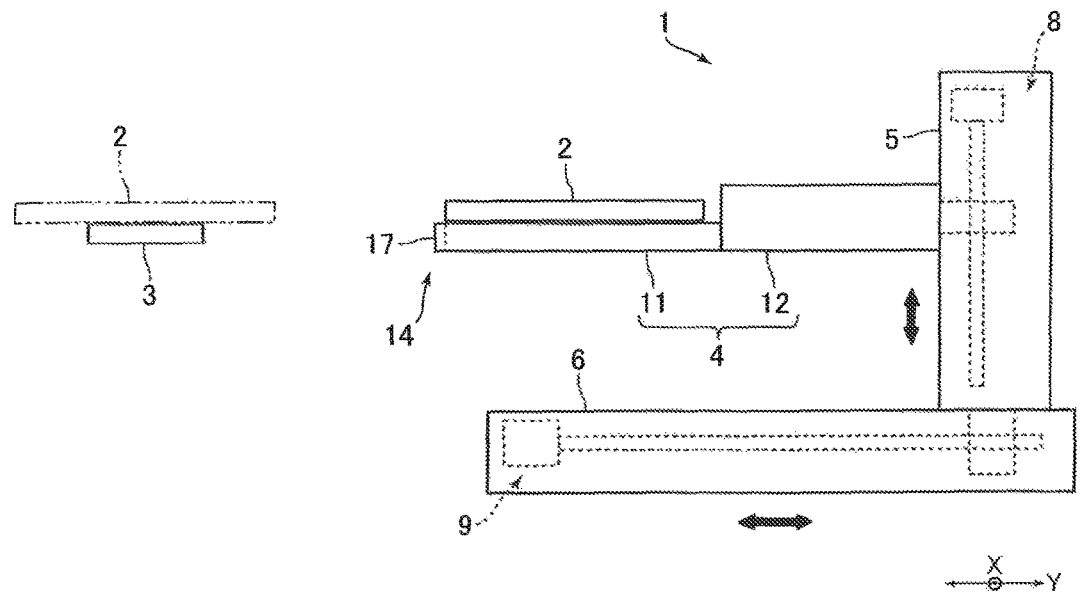
FIG. 1 is a side view drawing that shows a schematic configuration of an industrial robot according to an embodiment of the present invention.
Figure 2:
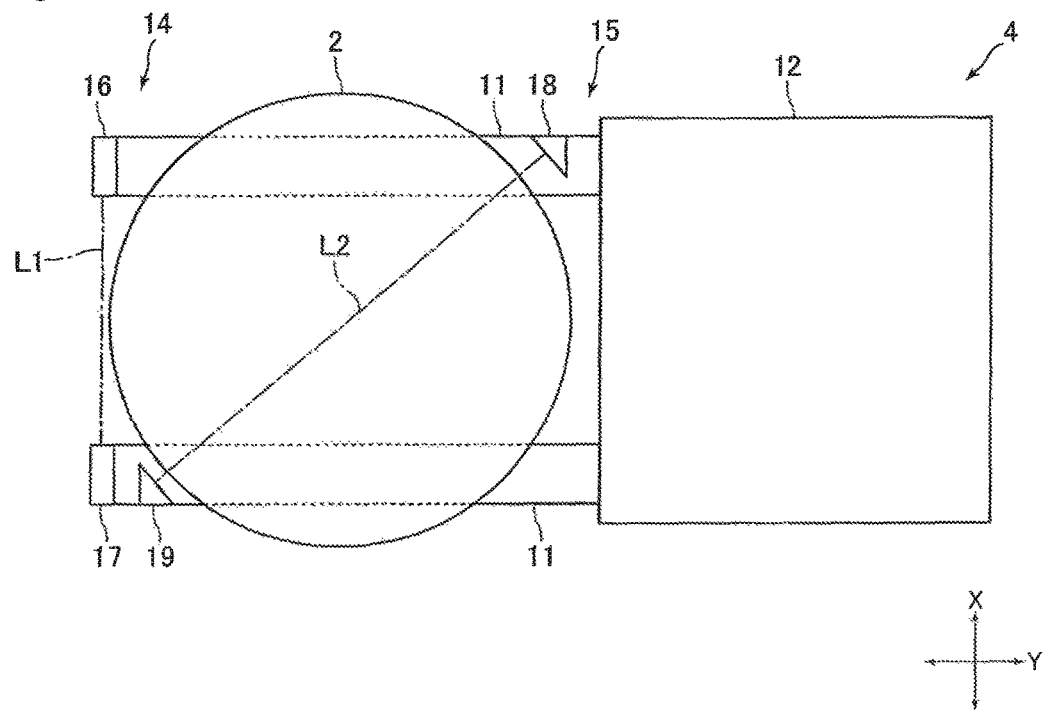
FIG. 2 is a plan view of a hand shown in FIG. 1.
Figure 3A:
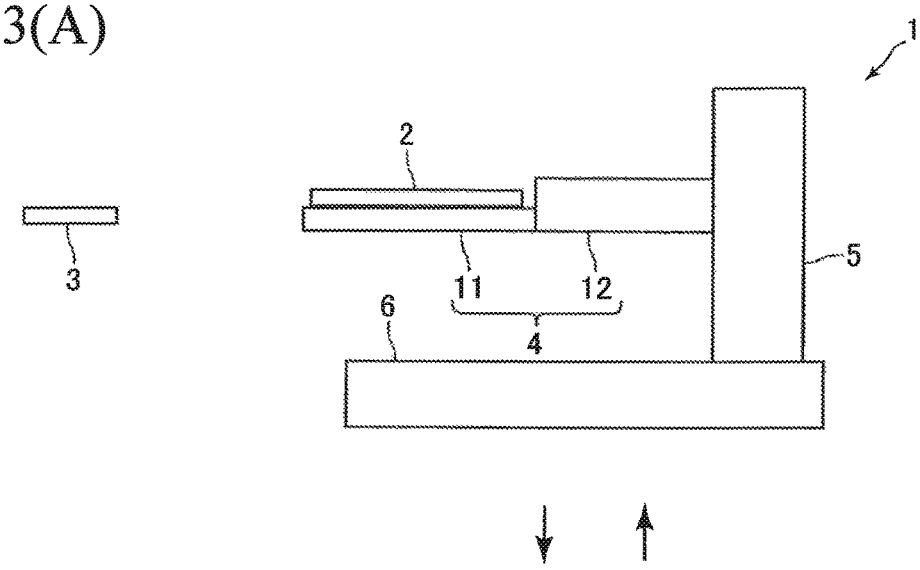
FIG. 3A through 3C include diagrams for explaining movements of the industrial robot shown in FIG. 1.
Figure 3B:
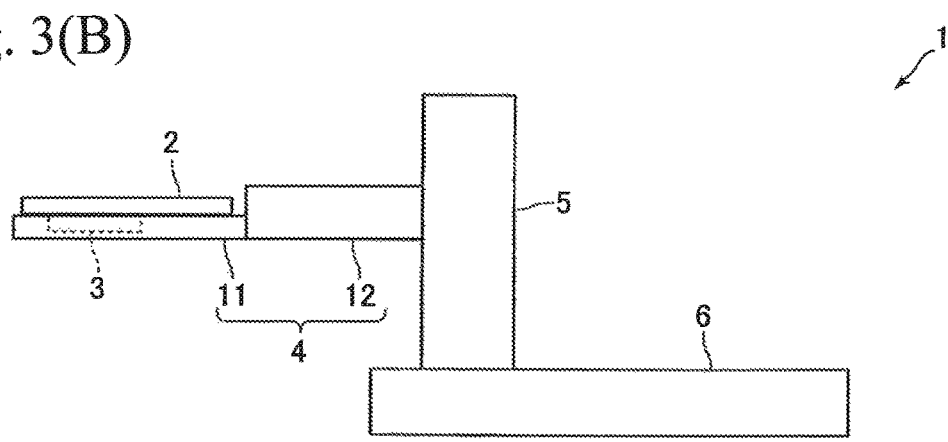
Figure 3C:
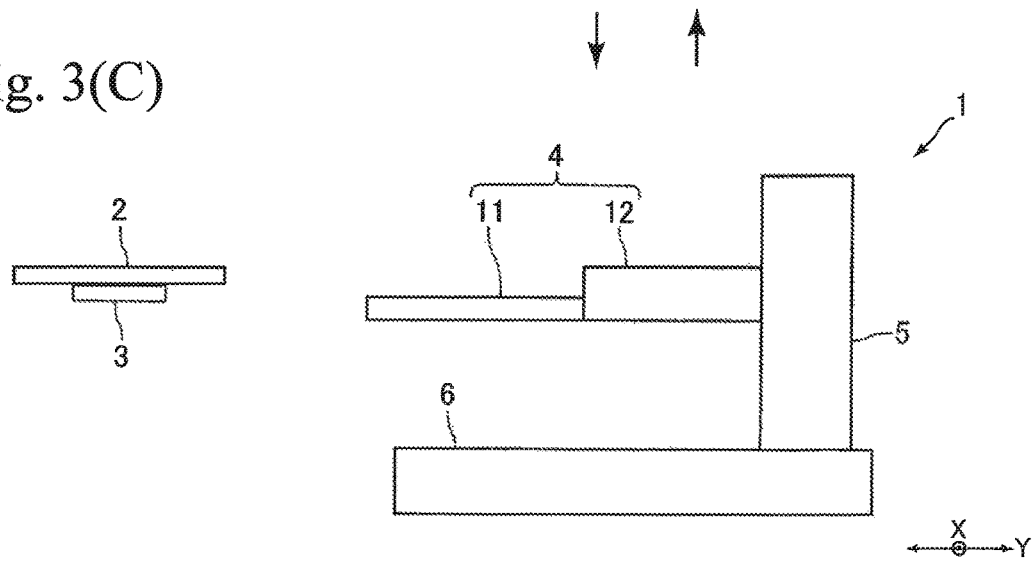

FIG. 1 is a side view drawing that shows a schematic configuration of an industrial robot 1 according to an embodiment of the present invention. FIG. 2 is a plan view of a hand 4 shown in FIG. 1. FIG. 3A through 3C include diagrams for explaining movements of the industrial robot 1 shown in FIG. 1.

The industrial robot 1 (hereinafter, called a "robot 1") according to the present embodiment is a robot for transferring a semiconductor wafer 2 (hereinafter, called a "wafer 2") that is a transfer object. Specifically to describe, the robot 1 is a robot for loading the wafer 2 onto an installation unit 3, where the wafer 2 is installed, and unloading the wafer 2 out of the installation unit 3. The wafer 2 is shaped as a disk. For example, the installation unit 3 is placed inside a processing device that carries out a predetermined process with respect to the wafer 2. Moreover, the installation unit 3 is shaped to be a circular disk.

The robot 1 includes a hand 4 for grasping the wafer 2, a column section 5 that supports the hand 4 in such a way as to be able to move the hand 4 up and down, a base section 6 that supports the column section 5 in such a way as to be able to transfer the column section 5 in a horizontal direction, and a lifting mechanism 8 for moving the hand 4 up and down with respect to the column section 5. Moreover, the robot 1 includes a transfer mechanism 9 that linearly transfers the hand 4 and the column section 5 in a horizontal direction with respect to the base section 6, in such a way that the hand 4 linearly moves in the horizontal direction at a time of transferring the wafer 2. In the following explanation, a moving direction of the hand 4 (the Y-direction shown in FIG. 1 and like) at a time of transferring the wafer 2 with respect to the installation unit 3 (in other words, at a time of loading the wafer 2 onto the installation unit 3 and unloading the wafer 2 out of the installation unit 3) is dealt with as a front-back direction; and in the meantime, a direction perpendicular to a vertical direction and the front-back direction (the X-direction shown in FIG. 1 and like) is dealt with as a right-and-left direction. In the present embodiment, the front-back direction is a first direction, and meanwhile the right-and-left direction is a second direction.

The column section 5 is shaped so as to be a column being slender in a vertical direction. For example, the lifting mechanism 8 includes a ball screw fixed to the column section 5 so as to be rotatable, a nut component engaged with the ball screw and fixed to the hand 4, a motor for turning the ball screw, and a guide part for guiding the hand 4 in a vertical direction. The lifting mechanism 8 is placed inside the column section 5 that is shaped to be hollow.

The base section 6 is shaped so as to be a block being slender in a front-back direction. For example, the transfer mechanism 9 includes a ball screw fixed to the base section 6 so as to be rotatable, a nut component engaged with the ball screw and fixed to the column section 5, a motor for turning the ball screw, and a guide part for guiding the column section 5 in a front-back direction. The transfer mechanism 9 is placed inside the base section 6 that is shaped to be hollow, in order to transfer the hand 4 and the column section 5 in a front-back direction.

For example, the hand 4 includes two fork parts 11 shaped to be bar-like, and a fork holder 12 to which root sides of the fork parts 11 are fixed. The fork parts 11 are linearly shaped. The two fork parts 11 are so placed as to be nearly in parallel with each other and to have a predetermined clearance between them in a right-and-left direction. The clearance between the two fork parts 11 is greater than a diameter of the installation unit 3. Moreover, the two fork parts 11 are positioned at the same elevation in a vertical direction. As shown in FIG. 2, the wafer 2 is placed on a top surface of the two fork parts 11. Furthermore, a top surface side of the fork parts 11 is equipped with a grasping mechanism (not shown) for grasping the wafer 2. The fork holder 12 is shaped to be block-like, and it is supported by the column section 5 in such a way as to be able to move up and down.

As shown in FIG. 2, the hand 4 is equipped with a sensor 14 as a first sensor, and a sensor 15 as a second sensor. The sensor 14 is an optical sensor of a transmission type, equipped with a light emitting part 16 having a light emitting element, and a light receiving part 17 having a light receiving element. In the same manner, the sensor 15 is an optical sensor of a transmission type, equipped with a light emitting part 18 having a light emitting element, and a light receiving part 19 having a light receiving element. Incidentally, an illustration of the sensor 15 is omitted in FIG. 1.

The light emitting part 16 is fixed to a top end of one of the two fork parts 11, and meanwhile the light receiving part 17 is fixed to a top end of the other of the two fork parts 11. The light emitting part 16 and the light receiving part 17 are so placed as to be face-to-face with each other in a right-and-left direction. In other words, the sensor 14 is placed in such a way that an optical axis L1 of the light emitting part 16 and the light receiving part 17 (concretely to describe, an optical axis of the light emitting element of the light emitting part 16 and the light receiving element of the light receiving part 17) is in parallel with a right-and-left direction.

The light emitting part 18 is fixed to a root end side part of one of the two fork parts 11, and meanwhile the light receiving part 19 is fixed to a top end side part of the other of the two fork parts 11. The light emitting part 18 and the light receiving part 19 are so placed as to be face-to-face with each other in a direction, which is tilted with respect to a front-back direction and a right-and-left direction as well. In other words, the sensor 15 is placed in such a way that an optical axis L2 of the light emitting part 18 and the light receiving part 19 (concretely to describe, an optical axis of the light emitting element of the light emitting part 18 and the light receiving element of the light receiving part 19) is in the direction tilted with respect to the front-back direction and the right-and-left direction as well, while the optical axis L2 being in parallel with a horizontal direction. Moreover, the light emitting part 18 and the light receiving part 19 are fixed to a top surface side of the fork parts 11. In the present embodiment, the sensor 15 serves a function of detecting the hand 4 grasping the wafer 2.

The robot 1 having a configuration as described above carries out loading the wafer 2 onto the installation unit 3, and unloading the wafer 2 out of the installation unit 3, as shown in FIG. 3A through FIG. 3C, by means of a combination of a vertical motion and a horizontal motion in a front-back direction of the hand 4.

(Method of Teaching a Position of the Wafer to be Installed on the Installation Unit)

Figure 4:
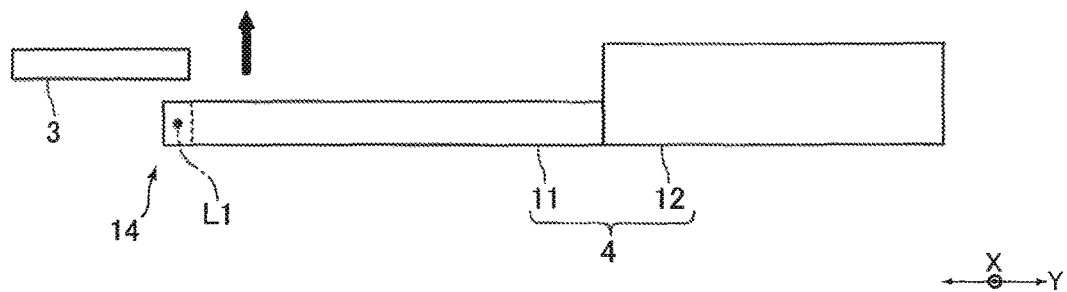
FIG. 4 is a diagram for explaining a movement of the hand at a time when the industrial robot shown in FIG. 1 detects a position of an installation unit in a vertical direction.
Figure 5:
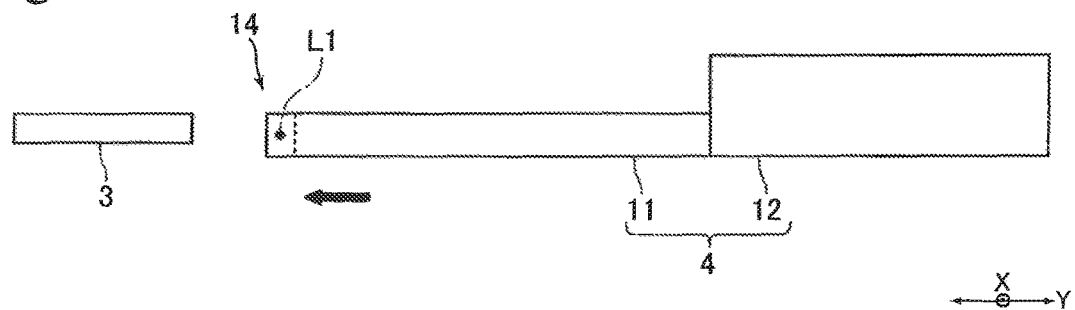
FIG. 5 is a diagram for explaining a movement of the hand at a time when the industrial robot shown in FIG. 1 detects a position of the installation unit in a front-back direction.
Figure 6:
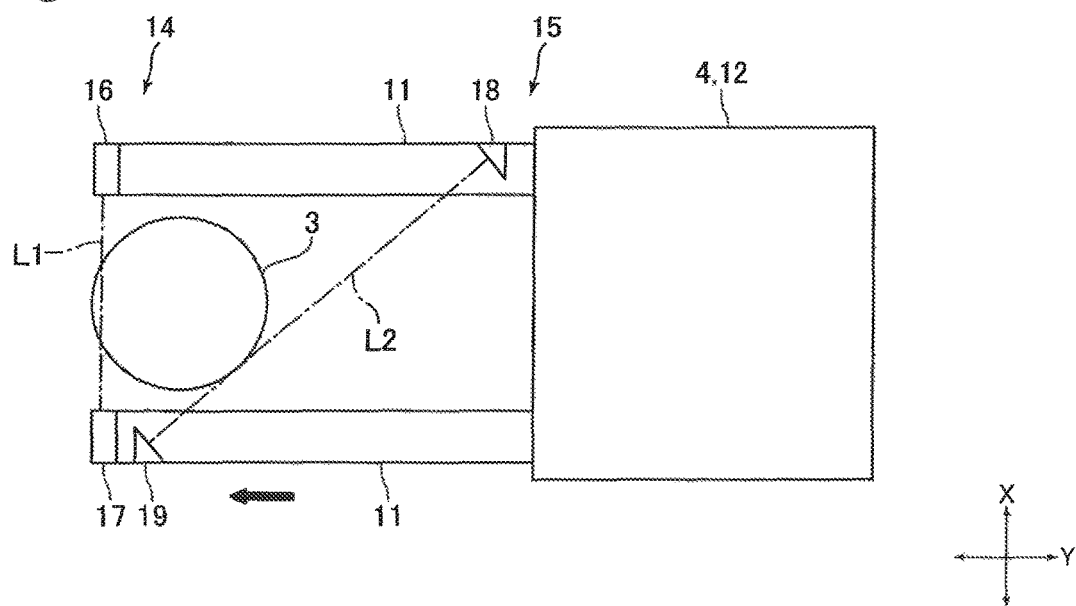
FIG. 6 is a diagram for explaining a movement of the hand at a time when the industrial robot shown in FIG. 1 detects a position of the installation unit in a right-and-left direction.
Figure 7:
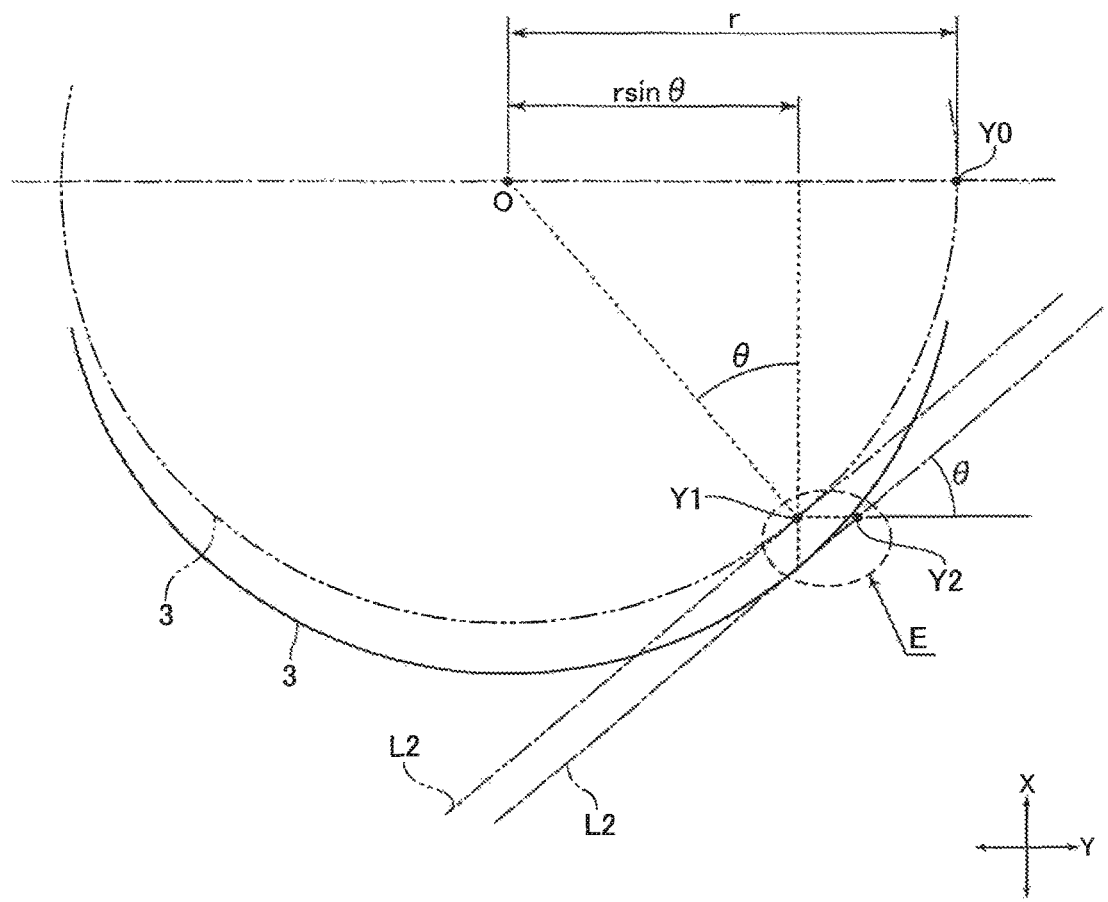
FIG. 7 is a diagram for explaining a method of calculating a position of the installation unit in the right-and-left direction, in the industrial robot shown in FIG. 1.
Figure 8:
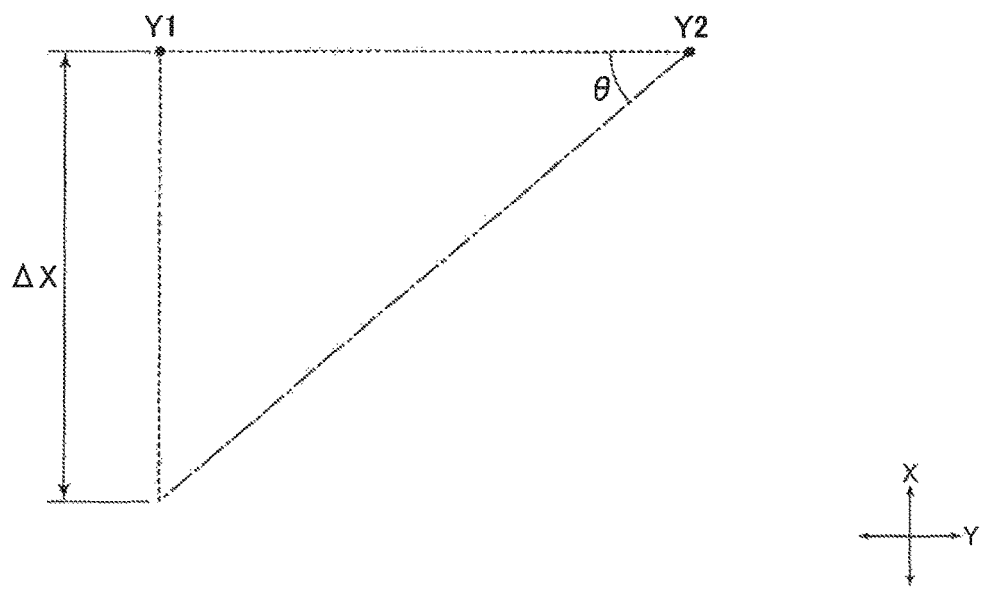
FIG. 8 is a magnified view of a section 'E' shown in FIG. 7.

FIG. 4 is a diagram for explaining a movement of the hand 4 at a time when the robot 1 shown in FIG. 1 detects a position of the installation unit 3 in a vertical direction. FIG. 5 is a diagram for explaining a movement of the hand 4 at a time when the robot 1 shown in FIG. 1 detects a position of the installation unit 3 in a front-back direction. FIG. 6 is a diagram for explaining a movement of the hand 4 at a time when the robot 1 shown in FIG. 1 detects a position of the installation unit 3 in a right-and-left direction. FIG. 7 is a diagram for explaining a method of calculating a position of the installation unit 3 in the right-and-left direction, in the robot 1 shown in FIG. 1. FIG. 8 is a magnified view of a section 'E' shown in FIG. 7.

In the present embodiment, a position of the wafer 2 to be installed on the installation unit 3 is automatically taught to the robot 1, on the basis of detection results with regard to the position of the installation unit 3 in the vertical direction, the position of the installation unit 3 in the front-back direction, and the position of the installation unit 3 in the right-and-left direction. Namely, in the present embodiment, at the time when the position of the wafer 2 to be installed on the installation unit 3 is taught to the robot 1, the position of the installation unit 3 in the vertical direction, the position of the installation unit 3 in the front-back direction, and the position of the installation unit 3 in the right-and-left direction are detected. Specifically to describe, the sensor 14 detects a position of the installation unit 3 in a vertical direction, while the hand 4 is lifted up and down by use of the lifting mechanism 8 in such a way that the optical axis L1 of the sensor 14 passes the installation unit 3 (refer to FIG. 4). More specifically to describe, the sensor 14 detects a position of either an upper surface or a lower surface of the installation unit 3, while the hand 4 is lifted up and down by use of the lifting mechanism 8. In the meantime, while the hand 4 is moved in a front-back direction by use of the transfer mechanism 9 in such a way that the optical axis L1 of the sensor 14 passes the installation unit 3, the sensor 14 detects a position of the installation unit 3 in the front-back direction (refer to FIG. 5). Further specifically to describe, the sensor 14 detects a position of a side surface of the installation unit 3, while the hand 4 is moved in the front-back direction by use of the transfer mechanism 9.

Furthermore, while the hand 4 is moved in the front-back direction by use of the transfer mechanism 9 in such a way that the optical axis L2 of the sensor 15 passes the installation unit 3, the sensor 15 detects a position of the installation unit 3 in the front-back direction (refer to FIG. 6). More specifically to describe, the sensor 15 detects a position of a side surface of the installation unit 3, while the hand 4 is moved in the front-back direction by use of the transfer mechanism 9. Furthermore, on the basis of the position of the installation unit 3 in the front-back direction, detected by the sensor 15, a position of the installation unit 3 in the right-and-left direction is calculated. In other words, the sensor 15 detects the position of the installation unit 3 in the front-back direction, and then the position of the installation unit 3 in the right-and-left direction is calculated.

Specifically to describe, in the case where the installation unit 3 is placed at a designed position of the installation unit 3 in the right-and-left direction (a position shown with a two-dot chain line in FIG. 7) as shown in FIG. 7 and FIG. 8; a coordinate in the front-back direction (Y-coordinate), at a time when the sensor 15 detects the installation unit 3, is represented as 'Y1'; a coordinate in the front-back direction, at a time when the sensor 15 detects the installation unit 3 located at a position shown with a solid line in FIG. 7, is represented as 'Y2'; and a tilt of the optical axis L2 with respect to the front-back direction is represented as 'θ'. Under the assumption described above, an amount of displacement 'ΔX' in the right-and-left direction, between the position where the installation unit 3 is actually located and the designed position of the installation unit 3 in the right-and-left direction, is calculated by use of an expression (1) shown below:

$$\Delta X = (Y2 - Y1) \times \tan\theta \quad \text{(Expression 1)}$$

Then, on the basis of the amount of displacement 'ΔX', a position of the installation unit 3 in the right-and-left direction is calculated.

Incidentally, as shown in FIG. 7, under conditions where a center of the installation unit 3 in a view from a vertical direction is represented as 'O', a radius of the installation unit 3 is represented as 'r', and a coordinate of the installation unit 3 detected by the sensor 14 in the front-back direction is expressed as 'Y0'; a coordinate 'Y1' is calculated by use of an expression (2) shown below:

$$Y1 = Y0 + (r - r \times \sin\theta) \quad \text{(Expression 2)}$$

In other words, the position of the installation unit 3 in the right-and-left direction is calculated on the basis of the position of the installation unit 3 in the front-back direction, detected by the sensor 14, and the position of the installation unit 3 in the front-back direction, detected by the sensor 15.

(Primary Advantageous Effect of the Present Embodiment)

As explained above, in the present embodiment, the sensor 15 is placed in such a way that the optical axis L2 of the light emitting part 18 and the light receiving part 19 is in the direction tilted with respect to the front-back direction and the right-and-left direction as well, while the optical axis L2 being in parallel with the horizontal direction. Furthermore, in the present embodiment; at a time of teaching the robot 1 a position of the wafer 2 to be installed on the installation unit 3, the hand 4 is moved by the transfer mechanism 9, in the front-back direction that is a moving direction of the hand 4 at a time of transferring the wafer 2, and then the sensor 15 detects the position of the installation unit 3 in the front-back direction, in order to calculate the position of the installation unit 3 in the right-and-left direction. In other words, in the present embodiment; at the time of teaching the robot 1 the position of the wafer 2 to be installed on the installation unit 3, the position of the installation unit 3 in the right-and-left direction is calculated on the basis of the detection result of the sensor 15, without moving the hand 4 in the right-and-left direction that is perpendicular to the moving direction of the hand 4 at the time of transferring the wafer 2. Therefore, according to the present embodiment, even though the space around the installation unit 3, where the transfer object is installed, is narrow; it becomes possible to automatically teach the robot 1 the position of the wafer 2 to be installed on the installation unit 3, on the basis of the position of the installation unit 3 detected by the sensor 14 in the vertical direction, the position of the installation unit 3 detected by the sensor 14 in the front-back direction, and the position of the installation unit 3 in the right-and-left direction calculated according to the detection result of the sensor 15.

In the present embodiment, the sensor 15 also serves a function of detecting the hand 4 grasping the wafer 2. Therefore, in comparison with a case where the sensor 15 is separately provided in addition to a sensor for detecting the hand 4 grasping the wafer 2, the present embodiment makes it possible to simplify the configuration of the robot 1.

(Other Embodiments)

Although the embodiment described above is an example of an embodiment according to the present invention, the present invention is not limited to the above embodiment and various variations and modifications can be made without changing the concept of the present invention.

In the embodiment described above; while the position of the installation unit 3 in the vertical direction, the position of the installation unit 3 in the front-back direction, and the position of the installation unit 3 in the right-and-left direction are detected by use of the sensor 14 and the sensor 15, the position of the wafer 2 to be installed on the installation unit 3 is taught to the robot 1 on the basis of the detection results. Otherwise, for example, a teaching jig may be installed on the installation unit 3 at the time of teaching the robot 1 the position of the wafer 2 to be installed on the installation unit 3. In this case, in the same manner as described in the embodiment mentioned above; while a position of the teaching jig in the vertical direction, a position of the teaching jig in the front-back direction, and a position of the teaching jig in the right-and-left direction are detected by use of the sensor 14 and the sensor 15, the position of the wafer 2 to be installed on the installation unit 3 is taught to the robot 1 on the basis of the detection results. Incidentally, in this case; if the teaching jig is placed at a designed position, a Y-coordinate of the teaching jig, which is corresponding to the coordinate 'Y1' described above, can directly be detected by the sensor 15, even without using a calculation formula corresponding to the expression (2) described above.

In the embodiment described above; the wafer 2 is placed on a top surface of the hand 4 (specifically to describe, the top surface of the two fork parts 11), and grasped there. Otherwise, for example, the wafer 2 may be grasped by the hand 4, in such a way that; the wafer 2 is held by a predetermined wafer holder, and meanwhile the two fork parts 11 are so configured as to be movable in the right-and-left direction, and a predetermined section of the wafer holder is pinched between the two fork parts 11. In other words, the wafer 2 may be grasped by the hand 4, by the intermediary of the wafer holder. Moreover, in this case, a predetermined section of the wafer holder may be installed on the installation unit 3. In other words, the wafer 2 may be installed on the installation unit 3, by the intermediary of the wafer holder.

In the present embodiment, the sensor 15 also serves a function of detecting the hand 4 grasping the wafer 2. Otherwise, for example, in addition to the sensor 15, another sensor in order to detect the hand 4 grasping the wafer 2 may separately be provided. Furthermore, although the sensor 14 and the sensor 15 are optical sensors of a transmission type in the embodiment described above, the sensor 14 and the sensor 15 may be optical sensors of a reflection type.

Although the installation unit 3 in the present embodiment is shaped to be a circular disk, the installation unit 3 may be so shaped as to have another form different from a circular disk. For example, the installation unit 3 may be shaped to be like an ellipse plate, or to have a polygonal form such as a square plate, or may be shaped to be blockish for having a predetermined form. In the case where the installation unit 3 is shaped to have another form different from a circular disk, the coordinate 'Y1' is not calculated by use of the expression (2) described above, and calculated by use of a predetermined calculation formula, in accordance with the form of the installation unit 3. In this case, the coordinate 'Y1' may be calculated by use of a CAD (Computer Assisted Drawing). Moreover, in the case where the installation unit 3 is so shaped as to have another form different from a circular disk; while a teaching jig is installed on the installation unit 3; and a position of the teaching jig in the vertical direction, a position of the teaching jig in the front-back direction, and a position of the teaching jig in the right-and-left direction are detected by use of the sensor 14 and the sensor 15; the position of the wafer 2 to be installed on the installation unit 3 may be taught to the robot 1 on the basis of the detection results. In this case, if the teaching jig is placed at a designed position, a Y-coordinate of the teaching jig, which is corresponding to the coordinate 'Y1', can directly be detected by the sensor 15, even without using a calculation formula.

Furthermore, although the coordinate 'Y1' of the installation unit 3 shaped to be a circular disk is calculated by use of the expression (2), in the embodiment described above, the coordinate 'Y1' of the installation unit 3 shaped to be a circular disk may be calculated by use of another predetermined calculation formula being different from the expression (2). In this case, the coordinate 'Y1' may be calculated by use of a CAD.

Furthermore, although the coordinate 'Y1' of the installation unit 3 shaped to be disk-like is calculated by use of the expression (2), in the embodiment described above, the coordinate 'Y1' of the installation unit 3 shaped to be disk-like may be calculated by use of another predetermined calculation formula being different from the expression (2). In this case, the coordinate 'Y1' may be calculated by use of a CAD.

In the embodiment described above, the robot 1 may be equipped with an expandable arm, wherein the hand 4 is connected to a top end side of the expandable arm so as to be rotatable. In this case, a root end side of the arm is connected to the column section 5 so as to be rotatable. Moreover, the hand 4 linearly moves in a front-back direction, by way of an expanding motion of the arm. Furthermore, in the embodiment described above, the robot 1 may be equipped with a rotating mechanism for rotating the column section 5 while having a rotating axis direction in a vertical direction, and may be equipped with a transfer mechanism for moving the column section 5 in a right-and-left direction. Meanwhile, although the transfer object to be transferred by the robot 1, in the embodiment described above, is the wafer 2, the transfer object to be transferred by the robot 1 may be anything else, such as a glass substrate and the like, other than the wafer 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A teaching method for an industrial robot comprising a hand that grasps a transfer object and linearly moves in a horizontal direction; a lifting mechanism for moving the hand up and down; a transfer mechanism for transferring the hand in a first direction, wherein the first direction represents a linear transfer direction of the hand at a time of transferring the transfer object to an installation unit, and a second direction being a linear direction perpendicular to the first direction and a vertical direction; and a first sensor and a second sensor, each including a light emitting element and a light receiving element, and being provided to the hand; wherein the first sensor is placed in such a way that an optical axis of the light emitting element of the first sensor and an optical axis of the light receiving element of the first sensor are in parallel with the second direction; the second sensor is placed in such a way that an optical axis of the light emitting element of the second sensor and an optical axis of the light receiving element of the second sensor are in a direction tilted with respect to the first direction and the second direction as well, while the optical axes being in parallel with a horizontal direction; the teaching method comprising:

while the hand is lifted up and down by the lifting mechanism, detecting, with the first sensor, a position of the installation unit or a teaching jig installed on the installation unit in a vertical direction;

while the hand is transferred in the first direction by the transfer mechanism, detecting, with the first sensor, a position of the installation unit or the teaching jig in the first direction;

while the hand is transferred in the first direction by the transfer mechanism, detecting, with the second sensor, a position of the installation unit or the teaching jig in the first direction; and calculating a position of the installation unit or the teaching jig in the second direction based on the position of the installation unit or the teaching jig in the first direction detected with the first sensor and the position of the installation unit or the teaching jig in the first direction detected with the second sensor, in order to teach a position of the transfer object to be installed on the installation unit based on an outer circumferential edge of the installation unit or the teaching jig.

\* \* \* \* \*